H. Y. NORWOOD & F. W. STALKER.
DISTANCE TEMPERATURE APPARATUS.
APPLICATION FILED JUNE 14, 1915.
1,277,464.
Patented Sept. 3, 1918.
2 SHEETS—SHEET 1.
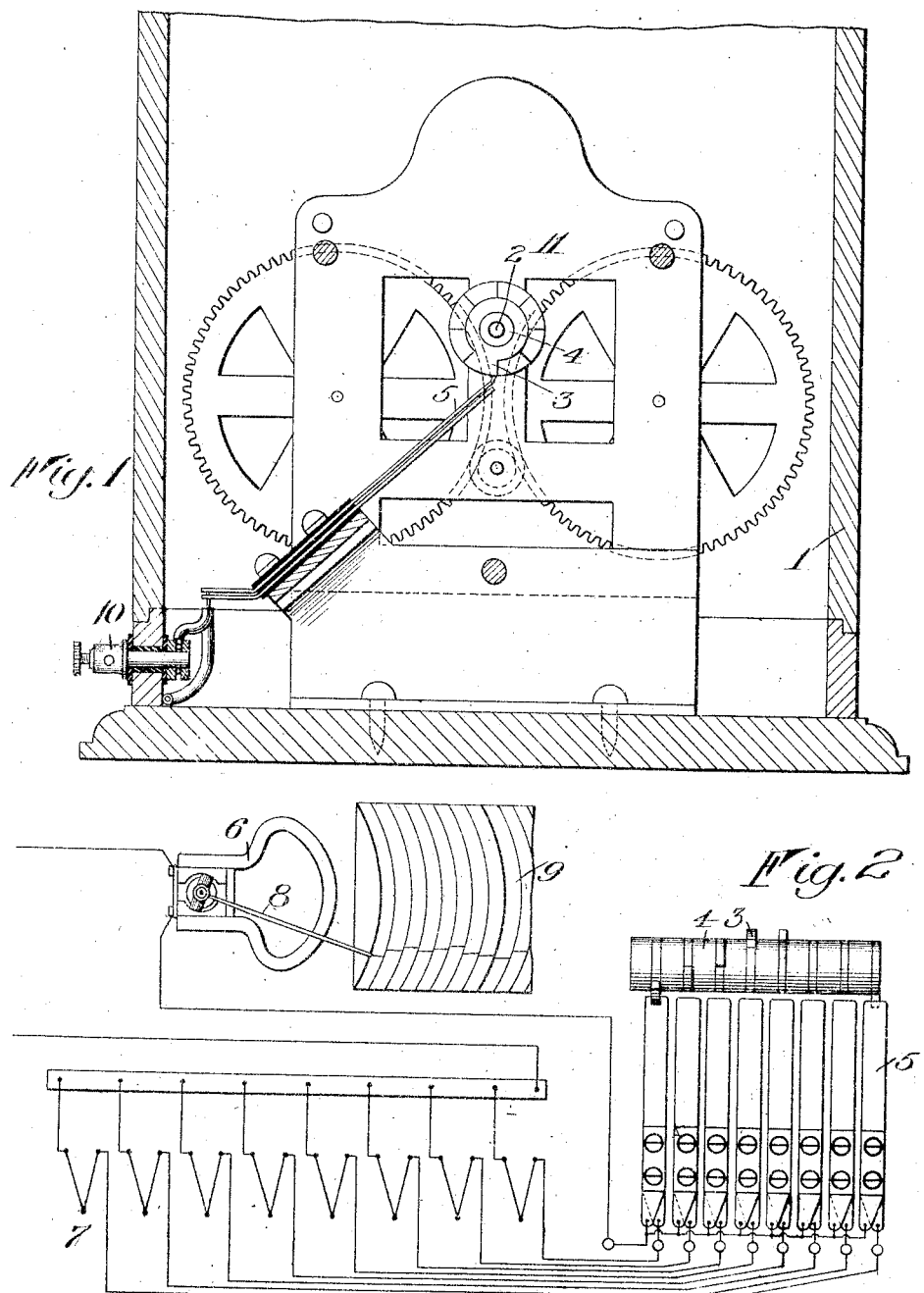
INVENTORS
Harry Y. Norwood
Frederick W. Stalker
BY
their ATTORNEYS H. Y. NORWOOD & F. W. STALKER.
DISTANCE TEMPERATURE APPARATUS.
APPLICATION FILED JUNE 14, 1915.
1,277,464.
Patented Sept. 3, 1918.
2 SHEETS—SHEET 2.
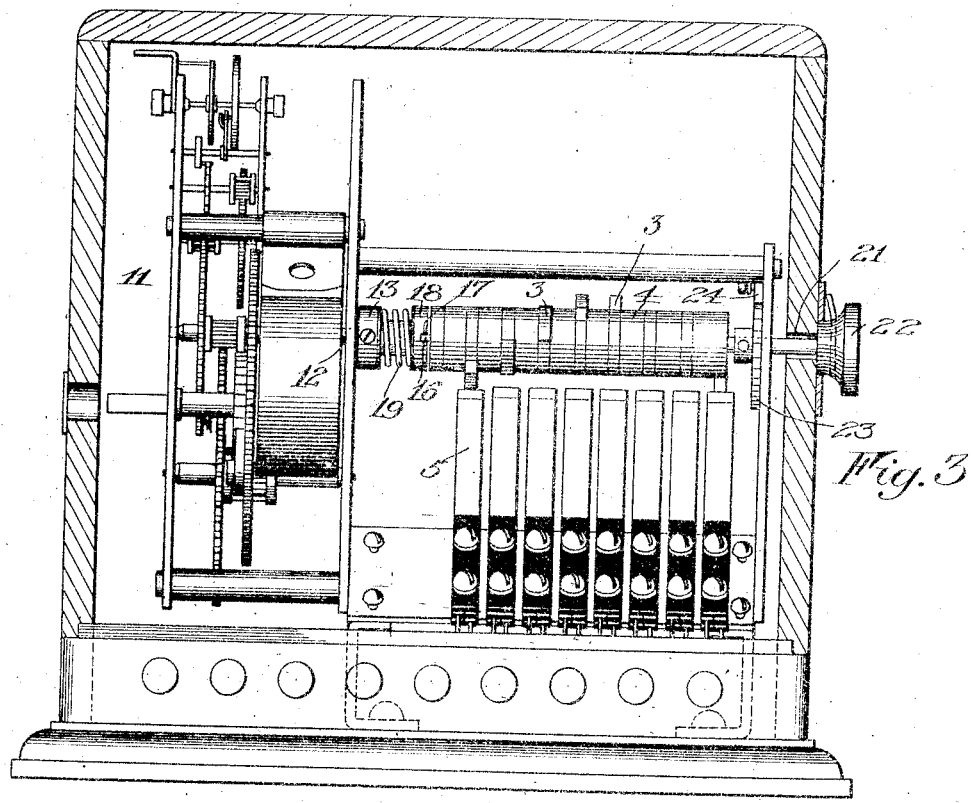
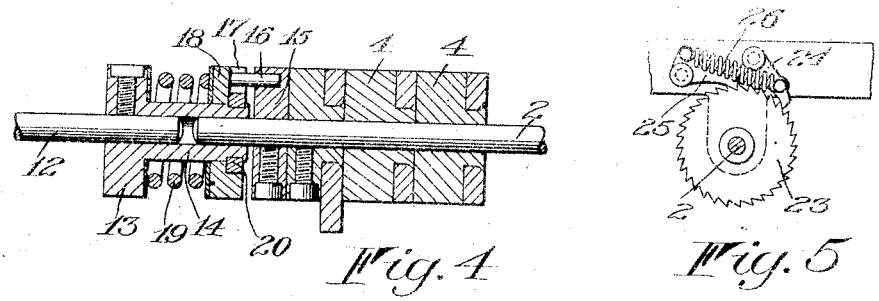
WITNESSES:
INVENTORS
Harry Y. Norwood
Frederick W. Stalker
BY
their ATTORNEYS

UNITED STATES PATENT OFFICE.

HARRY Y. NORWOOD AND FREDERICK W. STALKER, OF ROCHESTER, NEW YORK, ASSIGNORS TO TAYLOR INSTRUMENT COMPANIES, OF ROCHESTER, NEW YORK, A CORPORATION OF NEW YORK.

DISTANCE TEMPERATURE APPARATUS.

1,277,464.  Specification of Letters Patent.  Patented Sept. 3, 1918.

Application filed June 14, 1915. Serial No. 34,074.

*To all whom it may concern:*

Be it known that we, HARRY Y. NORWOOD and FREDERICK W. STALKER, both of Rochester, in the county of Monroe and State of New York, have invented certain new and useful Improvements in Distance Temperature Apparatus; and we do hereby declare the following to be a full, clear, and exact description of the same, reference being had to the accompanying drawings, forming a part of this specification, and to the reference-numerals marked thereon.

Our invention has for its purpose to provide a mechanism for determining at a central station the temperatures at a plurality of separated and distant points, either for indicating or for recording in such a way as to insure accuracy in the readings, and from a structure that is comparatively simple, both in its construction and operation. A further object of the invention is to make it possible to obtain automatically a series of indications or records from different points successively, or to obtain an individual reading at any time independently of the automatic operation. To these and other ends the invention resides in certain improvements and combinations of parts all as will be hereinafter more fully described, the novel features being pointed out in the claim at the end of the specification.

In the drawings:

Figure 1 is a transverse sectional view, showing a practical embodiment of the invention;

Fig. 2 is a diagrammatic view illustrating the arrangement of the controlling switch and electric connections therewith;

Fig. 3 is a longitudinal sectional view of the casing showing the interior parts in elevation;

Fig. 4 is a detail sectional view of a portion of the switch, and

Fig. 5 is a detail elevation of the locking means for preventing reverse movement of the switch.

Similar reference numerals in the several figures indicate the same parts.

The present embodiment is an illustration of a practical method for carrying out the features of our improvement, and embodies a casing 1 within which is arranged a movable switch, preferably rotary and comprising a spindle 2 carrying a series of contacts 3 which are insulated from each other by the sections 4, and arranged for coöperation with the several sets of contacts 5.

Each pair of contacts 5 is connected to a current actuated member, preferably in the form of a galvanometer 6, and 7 designates a series of thermopiles, each connected in series with the corresponding pair of contacts 5. It will be understood that in referring to the thermopiles 7, we may employ, and intend to cover any form of temperature actuated current controlling device, such as will be affected by variations in the temperature condition and cause a corresponding movement of the current actuated member. The galvanometer 6 includes an indicator 8 which may be provided with any convenient recording means arranged to coöperate with a chart 9. The casing 1 is provided with a series of terminals 10 which connect with the several pairs of contacts 5 and to which connection is made from the galvanometer 6 and the thermopiles 7.

The switch already described is arranged for continuous operation under normal conditions so as to automatically afford successive indications or readings of the temperatures at the different points. To this end we employ a motor, preferably in the form of a clock mechanism, such as designated generally at 11, and connected to the spindle 2 in the manner that will now be made clear. It is desirable at times to obtain a reading from a particular station independently of the automatic controlling mechanism, that is to say, out of the regular order in which it would be effected by the regular or normal operation. This we accomplish by the provision of means for permitting the switch to be rotated independently of the motor which normally drives it, preferably by establishing a frictional connection between the motor and the switch. To this end the arbor 12 of the clock mechanism, constituting the driving member, has fixed thereon a collar 13, the extension 14 of which loosely engages the end of the spindle 2. Fixedly mounted on the latter is a collar 15 carrying a pin or projection 16 which engages a recess 17 in a disk 18, the latter being loose on the extension 14. 19 is a spring disposed between collar 13 and the disk 18 and acting to maintain the latter against the shoulder 20 with sufficient friction to drive the switch under normal conditions. The spindle 2 extends through an opening 21 in the casing and is provided with a finger piece 22, enabling it to be rotated manually when any particular reading is desired, and under such conditions the disk 18 turns on the extension 14 independently of the latter, so that the switch can be operated to engage any one of the pairs of contacts 5 and thus close the circuit through the selected thermopile. In order to prevent a reverse manual operation of the switch the spindle 2 carries a toothed wheel 23 which is engaged by a pair of pawls 24 and 25 connected by a spring 26 in the manner shown in Fig. 5, and operating to prevent sufficient reverse movement of the switch to cause any damage to the contacts 5.

The structure which we have described is simple and comparatively economical to manufacture. It affords an automatic operation, both certain and accurate, and effective in obtaining a series of temperature readings from points located distantly with relation to a central station. A further advantage lies in the facility with which a reading can be selectively taken from any one of the stations during the operation of the automatic controlling means and independently of it. The invention is not to be limited to the particular form or arrangement of parts disclosed in the application, since it includes any modifications that will act according to the principles and contemplated results of the present structure.

We claim as our invention:

In a distance temperature apparatus, the combination with an electric circuit including a current actuated member, of a plurality of thermopiles adapted to be successively connected with said current actuated member, a rotary switch acting to close the circuit through any one of said thermopiles, continuously operating mechanism for driving the switch, a frictional connection between the continuously operating mechanism and the switch permitting the latter to be moved independently of said mechanism and to close the circuit selectively through any of the thermopiles, and hand operated means for moving the switch independently of said mechanism.

HARRY Y. NORWOOD.
FREDERICK W. STALKER.

Witnesses:
 ISAAC MAYER,
 JOHN H. NEUBERT.